(12) United States Patent
Winde (10) Patent No.: US 10,788,969 B2
(45) Date of Patent: Sep. 29, 2020

(54) METHOD FOR REMOTE MONITORING OF THE OPERATION OF A HOUSEHOLD APPLIANCE, PORTABLE COMMUNICATION END DEVICE, AND COMPUTER PROGRAM PRODUCT

(71) Applicant: BSH HAUSGERAETE GMBH, Munich (DE)

(72) Inventor: Mirco Winde, Munich (DE)

(73) Assignee: BSH Hausgeraete GmbH, Munich (DE)

( * ) Notice: Subject to any disclaimer, the term of this patent is extended or adjusted under 35 U.S.C. 154(b) by 193 days.

(21) Appl. No.: 15/038,497

(22) PCT Filed: Nov. 20, 2014

(86) PCT No.: PCT/EP2014/075173
§ 371 (c)(1),
(2) Date: May 23, 2016

(87) PCT Pub. No.: WO2015/075130
PCT Pub. Date: May 28, 2015

(65) Prior Publication Data
US 2016/0299675 A1  Oct. 13, 2016

(30) Foreign Application Priority Data

Nov. 22, 2013 (DE) .......................... 10 2013 223 932

(51) Int. Cl.
*G06F 17/00* (2019.01)
*G06F 3/0484* (2013.01)
(Continued)

(52) U.S. Cl.
CPC ........ *G06F 3/04847* (2013.01); *G06F 3/0482* (2013.01); *G06T 11/001* (2013.01);
(Continued)

(58) Field of Classification Search
CPC .. G06F 3/04847; G06F 3/0482; G06F 3/0486; G06F 19/3418; G06T 11/001;
(Continued)

(56) References Cited

U.S. PATENT DOCUMENTS

| 6,961,445 B1 * | 11/2005 | Jensen | G08B 13/194 |
| | | | 348/208.15 |
| 2004/0046712 A1 * | 3/2004 | Naimer | G01C 23/005 |
| | | | 345/9 |

(Continued)

FOREIGN PATENT DOCUMENTS

| DE | 102009033361 A1 | 4/2010 |
| EP | 1338961 A2 | 8/2003 |

OTHER PUBLICATIONS

Marusic, L., et al., "Home-in-Palm—A Mobile Service for Remote Control of Household Energy Consumption", Proceedings of the 11th Conference on Telecommunications, Jun. 15-17, 2011, pp. 109-116, Graz, Austria.

*Primary Examiner* — Jason T Edwards
(74) *Attorney, Agent, or Firm* — Laurence A. Greenberg; Werner H. Stemer; Ralph E. Locher (57) ABSTRACT

A method remotely monitors an operation of a household appliance by a portable communication end device by receiving status data of the appliance. A current operating state of the appliance is detected based on received status data via a control unit and by actuating a display for displaying a graphical user interface for remote monitoring of the operation by the control unit. The current operating status of the appliance is output. The outputting of the current operating status includes an image depiction which characterizes the current operating status. To generate the image depiction, differential features between the current operating status and a reference status of the appliance are identified and a basis image, in which the appliance is shown (Continued)

in the reference status, is overlaid by an overlay image illustrating the differential features, which overlay image illustrates the appliance in the current operating status in interaction with the basis image.

8 Claims, 3 Drawing Sheets

(51) Int. Cl.
| | |
|---|---|
| *G08C 17/02* | (2006.01) |
| *H04Q 9/00* | (2006.01) |
| *H04L 12/64* | (2006.01) |
| *G06F 3/0482* | (2013.01) |
| *G06T 11/00* | (2006.01) |
| *G06T 11/60* | (2006.01) |
| *G06T 13/80* | (2011.01) |

(52) U.S. Cl.
CPC .............. *G06T 11/60* (2013.01); *G06T 13/80* (2013.01); *G08C 17/02* (2013.01); *H04L 12/6418* (2013.01); *H04Q 9/00* (2013.01); *G06T 2200/24* (2013.01); *G08C 2201/30* (2013.01); *G08C 2201/93* (2013.01)

(58) Field of Classification Search
CPC ..... G06T 11/60; G06T 13/80; G06T 2200/24; G08C 17/02; G08C 2201/30; G08C 2201/93; H04L 12/6418; H04Q 9/00
USPC .......................................................... 715/740
See application file for complete search history.

(56) References Cited

U.S. PATENT DOCUMENTS

| | | | | |
|---|---|---|---|---|
| 2005/0046699 A1* | 3/2005 | Oya | ................. | G08B 13/19602 348/207.1 |
| 2005/0069207 A1* | 3/2005 | Zakrzewski | ....... | B64D 45/0015 382/190 |
| 2005/0264796 A1* | 12/2005 | Shaw | ................... | G01B 11/162 356/237.2 |
| 2006/0200253 A1* | 9/2006 | Hoffberg | ................ | G05B 15/02 700/19 |
| 2009/0314016 A1* | 12/2009 | Ashrafzadeh | ........... | F25C 5/187 62/137 |
| 2010/0046791 A1* | 2/2010 | Glickman | .............. | G06K 9/209 382/100 |
| 2010/0182136 A1* | 7/2010 | Pryor | .................... | G01F 23/292 340/425.5 |
| 2011/0185790 A1* | 8/2011 | Choi | ........................ | G01M 3/04 73/40 |
| 2013/0051611 A1* | 2/2013 | Hicks | ................. | G06Q 10/0875 382/103 |
| 2013/0182009 A1* | 7/2013 | Nielsen | ................... | G01C 15/02 345/629 |
| 2013/0188878 A1* | 7/2013 | Kacenjar | ................. | G06T 3/0068 382/209 |
| 2013/0214935 A1* | 8/2013 | Kim | .................... | H04L 12/2816 340/870.02 |
| 2013/0310990 A1* | 11/2013 | Peret | .................... | F16M 11/041 700/282 |
| 2013/0328661 A1* | 12/2013 | Phillips | .............. | G06K 9/00771 340/5.7 |

* cited by examiner

METHOD FOR REMOTE MONITORING OF THE OPERATION OF A HOUSEHOLD APPLIANCE, PORTABLE COMMUNICATION END DEVICE, AND COMPUTER PROGRAM PRODUCT

BACKGROUND OF THE INVENTION

Field of the Invention

The invention relates to a method for remote monitoring of the operation of a household appliance by means of an in particular portable communication end device, wherein status data of the household appliance is received by a communication apparatus of the communication end device and a current operating status of the household appliance is detected by a control unit of the communication end device on the basis of the received status data. The control unit controls a display apparatus of the communication end device for the purpose of displaying a graphical user interface which serves for remote monitoring of the operation, wherein the current operating status of the household appliance is output via the user interface. The invention also relates to a portable communication end device which is configured for performing such a method, as well as to a computer program product having a storage medium on which is stored a computer program for performing a method of said type.

Equipping household appliances with a communication apparatus via which a wireless communication with a mobile communication end device can be performed is already prior art. In this case the data communication between the household appliances at one end and a mobile terminal device at the other end can be realized directly using a wireless home network, such as a WLAN network, for example. Alternatively, the data communication can also take place through the medium of an internet server, the household appliances in this case being able to communicate with the internet server by way of a WLAN router, for example. Typically, the data communication is carried out via the home network, as long as the portable terminal device is located within range of said network. If the portable terminal device is out of range, the data communication then takes place via the internet server. If, for example, a mobile telephone is used as the portable terminal device, the communication link to the internet server is set up via a mobile communications network.

In the present context, the focus of interest is on the remote monitoring of the operation of household appliances with the aid of a portable communication end device, such as a mobile telephone (smartphone), for example, or else a tablet PC or the like. To that end there can be installed on the portable communication end device an application or app (computer program) by means of which a graphical user interface is generated on a display of the terminal device. Such a graphical user interface, which typically is configured not only for remote monitoring, but also for remote control of the household appliances, is usually provided on a touchscreen of the mobile terminal device so that the user can control and operate the household appliances via said user interface. Signals are transmitted for that purpose between the household appliances on one side and the mobile terminal device on the other: Status data containing information about the current operating status of the household appliance in question can be transmitted from the household appliances to the mobile terminal device. Conversely, control signals by means of which the household appliance in question can be actuated can also be transmitted from the mobile terminal device to the respective household appliances. Said control signals can include, for example, settings for the respective household appliance which are then applied to the respective household appliance. The control signals can, however, also be used to activate a household appliance from a standby mode and to deactivate the same again, and/or an operating process of the household appliance can be initiated and/or interrupted thereby.

A data communication between household appliances on one side and an internet server or a portable communication end device on the other is made possible for example by the system "Home Connect", which is available from the applicant's company.

A cited graphical user interface of the company Miele is known by the name "Infocontrol Plus", for example. An aspect that is to be regarded as disadvantageous with said user interface is the fact that the current operating status of the household appliances is signaled or displayed only to an inadequate extent. This is because the current operating status is usually output in text form, as a result of which only an inadequate presentation of information is possible overall. Since the user is only kept informed to an inadequate extent about the current operating status of the respective household appliance, errors in operating the household appliances cannot be entirely ruled out.

BRIEF SUMMARY OF THE INVENTION

It is the object of the invention, in the case of a method of the generic type cited in the introduction, to take measures which ensure, with minimal technical overhead, that the user can identify the current operating status of the household appliance particularly quickly and reliably during the remote monitoring and as a result in particular errors in operating the household appliance can be prevented.

This object is achieved according to the invention by a method, by a portable communication end device and by a computer program product having the features disclosed in the respective independent claims. Advantageous embodiments of the invention are the subject matter of the dependent claims, the description and the figures.

A method according to the invention is used for remote monitoring of the operation of a household appliance with the aid of an in particular portable or mobile communication end device that is separate from the household appliance. A communication apparatus of the communication end device receives status data of the household appliance. A control unit of the communication end device detects a current operating status of the household appliance on the basis of the received status data and controls a display apparatus (e.g. a touchscreen) of the communication end device in order to display a graphical user interface which serves for remote monitoring of the operation—and in particular also for remote control—of the household appliance. The current operating status of the household appliance is output via the user interface. According to the invention, outputting the current operating status entails an image depiction characterizing the current operating status being generated in the user interface by the control unit. In order to provide said image depiction, differential features between the current operating status and a reference status of the household appliance are identified. In order to generate the image depiction, a basis image, in which the household appliance is illustrated in the reference status, is overlaid with at least one overlay image which illustrates the differential features and which, in cooperative interaction with the basis image, visualizes the household appliance in the current operating status.

The household appliance itself is therefore shown representationally on the basis image and accordingly presented in its shape and embodiment. Accordingly, at least some material components of the household appliance are represented in the basis image itself and thus at least one detail of the overall household appliance is illustrated realistically in the basis image. In particular, these components are represented geometrically and consequently realistically with regard to their specific shape, and not just in simplified symbolic form, such that representing them in a form that is close to reality also leads to an improved perceptibility and an improved understanding of the operating status on the part of the user. In particular, a perspective view of the components is shown in the basis image, in particular a perspective partial view of one component, as a result of which a realistic view is achieved which is also enlarged and once again more detailed, and as a consequence the understanding of the operating status on the part of a user is even more simple and clear. Accordingly, the differential features are displayed pictorially by means of realistic elements, such that here too the true differential features appearing or occurring in reality are illustrated in a form that is close to reality. As a result of this also, the operating status that is to be displayed pictorially is presented very realistically and in a form that is very easily recognizable for a user. In particular, the basis image and the overlay image are displayed as color images, thereby further increasing the sense of realism.

According to the invention, an image depiction is accordingly generated in which an overlay image, or simply "overlay", is superimposed on a basis image in order to visualize the current operating status of the household appliance. In this case the basis image illustrates the household appliance in a reference status, for instance in an off state or a standby state, whereas in the overlay image differential features are shown which represent a difference between the current operating status and the reference status. If the current operating status corresponds for example to an activated state in which the household appliance is performing an operating process, then the differential features can relate for example to water drops and/or water spray (in the case of a water-conducting household appliance) or else to clouds of steam and/or heat waves (in the case of a cooking appliance). In other words, in the course of the image depiction a plurality of image layers, arranged one on top of the other, are generated, each of which separately represents an individual operating status of the household appliance, the image layers cooperatively interacting with one another in such a way that overall the current operating status of the household appliance is visualized. By means of such an approach the possibility is created that the user, when viewing the graphical user interface, can identify the current operating status of the household appliance particularly quickly and reliably, while at the same time the technical overhead required for generating the image depiction is very small, since the basis image can be used for a plurality of operating states and is therefore status-neutral. For example, the basis image can be presented for all possible operating states and in addition thereto an appropriate overlay image can simply be selected and superimposed on the basis image, and moreover as a function of the current operating status of the household appliance at any given time. Accordingly, errors in operating the household appliance by the user can be reliably prevented without a great deal of effort.

It can be provided in particular that the cited image depiction is generated in real time or "online"—i.e. at the moment of being accessed. Alternatively, however, the image depiction can also be made available "offline", i.e. as a finished, ready-to-retrieve element.

The data communication between the (portable) communication end device on one side and the household appliance on the other can take place for example via a wireless home network, a WLAN network, for example, and/or by way of an internet server. In particular it is provided that the data communication is carried out via the home network, as long as the portable communication end device is located within range of the home network. If the portable communication end device is located out of range, the data communication can take place by way of the internet server, in which case the communication link to the internet server can be set up in particular via a mobile communications network. The household appliance can in this case be attached to the home network—specifically to a WLAN router—via an associated communication interface.

Preferably, the operation of a plurality of household appliances can be monitored by means of the cited user interface. Preferably, said user interface also enables a remote control of a plurality of household appliances. In this case the user interface can for example have a number of separately selectable pages, each of which is associated with one household appliance, and support the remote control as well as the remote monitoring of the associated household appliance.

What is understood by a household appliance in the present context is in particular a device which is employed for housekeeping purposes. This can be in particular a large household appliance, such as, for example, an appliance for treating items of laundry, a household appliance for preparing foodstuffs, for example a cooking appliance, such as a baking oven or a stove, for example, a household appliance for storing and preserving foodstuffs, such as a household refrigerating appliance, for example a refrigerator or a freezer or a fridge-freezer, an air conditioning unit or a dishwasher. An appliance for treating items of laundry can in this case be a washing machine, a tumble dryer or a washer-dryer. On the other hand, the household appliance may also be a small household appliance, such as a fully automatic coffee machine or a food processor, for example.

What is understood by a portable communication end device in the present context is a mobile terminal device which is embodied for wireless communication in accordance with a predetermined communication standard and on which new applications or apps (computer programs) can be installed and then executed. The portable communication end device can be for example a mobile telephone (smartphone), a tablet PC or a comparable mobile terminal device, such as an MP3 player having a corresponding communication apparatus and a display apparatus, for example. In this case this embodiment variant exploits the fact that these days practically everyone possesses an intelligent mobile telephone with a display, thus rendering the use of additional communication devices superfluous.

Alternatively, the communication end device can also be a stationary device, such as a PC, for example.

In order to visualize the current operating status of the household appliance, an image depiction is therefore generated in which at least one overlay image is superimposed on the basis image. For this purpose, use can be made of the technique known as alpha blending, for example, by means of which the basis image and the overlay image can be combined with one another.

Preferably it is provided that the household appliance is depicted in an off state or in a standby state in the basis image. The reference status can therefore be an off state, in which the household appliance is completely disconnected from an energy supply source, or a standby state, in which the household appliance is ready for operation. In this case an interior of the household appliance, for example, can be represented in the basis image. This basis image is preferably a static and therefore a non-moving image.

If an off state and/or a standby state of the household appliance are/is detected by the control unit of the (portable) communication end device, then just the basis image can be displayed in the user interface, without the overlay image. The off state and/or the standby state are/is therefore signaled solely by the basis image, in which preferably an interior of the household appliance is represented as a static image. In this case it is also possible to choose between two basis images, namely a first basis image for the off state and a second basis image for the standby state. In the off state, a basis image can be displayed in which the interior of the household appliance is depicted without any additional contents and in particular also in black and white. The standby state, in contrast, can be signaled by means of a basis image in which the interior of the household appliance is depicted with additional contents (for example, items of laundry or dishware) and in particular also in color. The information is consequently presented in a particularly straightforward manner, enabling the current operating status of the household appliance at any given time to be identified quickly and reliably.

If an activated state of the household appliance in which the household appliance is performing an operating process is detected by the control unit of the (portable) communication end device, the image depiction comprising the basis image and in addition the overlay image can be displayed in the user interface. The combined image depiction is therefore preferably generated when the household appliance is active and currently performing an operating process, for example a washing process, a drying process or the like. The overlay image can in this case be chosen specifically or individually for each phase of the operating process, for example for a washing phase, a spinning phase and a drying phase of a washing and drying process of a washer-dryer.

It proves particularly advantageous when an overlay image is provided in the form of a pictorial animation by means of which the above-cited differential features are represented as moving. By means of such a moving animation, which effectively constitutes a video, the current operating status of the household appliance can be perceived even more intuitively and consequently can be identified in a particularly reliable manner.

One of the following images can be provided as an overlay image, the choice of the overlay image preferably being made as a function of the current operating status and/or as a function of the type of household appliance:

An image in which water drops and/or water sprays are depicted can be generated as an overlay image. These then represent the above-cited differential features, which proves to be especially advantageous in particular in the case of a water-conducting household appliance. This is because when a water-conducting household appliance is in the activated state, water is circulated in the interior of the household appliance. These differential features can now be visualized in the overlay image.

In addition or alternatively, an overlay image can be provided in the form of an image in which clouds of steam are depicted as differential features. This overlay image proves to be especially advantageous in particular for representing the activated operating status of a cooking appliance, such as in particular a steam baking oven, and/or a water-conducting household appliance and/or a tumble dryer. The activated operating status of a household appliance of said type can be signaled particularly effectively by means of an animation depicting clouds of steam.

Furthermore, in addition or alternatively, an overlay image can be provided in the form of an image in which clouds of vapor are depicted as differential features. This overlay image also enables the activated operating status of a cooking appliance to be represented in a reliable manner.

Furthermore, in addition or alternatively, an overlay image can be provided in the form of an image in which heat waves or microwaves (these can be represented in the form of moving ribs, for example) are depicted as differential features. This overlay image is likewise particularly well-suited for representing the activated state of a cooking appliance, such as in particular a microwave oven or baking oven.

Furthermore, in addition or alternatively, an overlay image can be provided in the form of an image in which frost is depicted as a differential feature. An overlay image of said type can be used for example in the case of a refrigerating appliance.

It is also possible to provide, as an overlay image, an image by means of which a vibration of the depicted household appliance is effected. An overlay image of said type can be provided for example by means of an animation in which the outlines of the household appliance are periodically moved. Such a vibration can be used in particular to signal a spin cycle of a washing machine.

In one embodiment variant, a color filter by means of which a coloring of the basis image is changed is generated as an overlay image. The coloring of the displayed image depiction can therefore also be set as a function of the current operating status of the household appliance, thus additionally enhancing the presentation of information. For example, this can also be implemented in such a way that in an off state of the household appliance a black-and-white basis image is displayed, upon which, following a switchover to a standby state, a corresponding overlay image is superimposed, thereby generating a color image from the black-and-white basis image. The coloring can, however, also be changed in the activated state of the household appliance, for example when a transition is made from a wash cycle to a spin cycle.

An overlay image also enables components to be added to and/or removed from the household appliance depicted in the basis image as necessary. It is possible for example to indicate a closed door of the household appliance with a first overlay image and an open door with a second overlay image. By means of said overlay images it is then possible to distinguish between a deactivated and an activated state of the household appliance.

Preferably, the basis image and/or the overlay image are/is read out from a data memory of the (portable) communication end device as a function of the current operating mode and/or as a function of the type of household appliance, without the need for the images to be transferred from the internet server or the household appliance itself to the communication end device. The data transmission overhead can therefore be reduced or the volume of data to be transferred kept to a minimum.

The invention also relates to a portable communication end device which is configured for performing a method according to the invention.

A computer program product according to the invention comprises a storage medium or data medium on which is stored a computer program which is configured for performing a method according to the invention when executed on a portable communication end device.

Further features of the invention will become apparent from the claims, the figures and the description of the figures. All of the features and feature combinations cited hereinabove in the description, as well as the features and feature combinations cited hereinbelow in the description of the figures and/or shown in the figures alone, can be used not only in the combination disclosed in each case, but also in other combinations or else in isolation.

BRIEF DESCRIPTION OF THE SEVERAL VIEWS OF THE DRAWING

The invention will now be explained in more detail with the aid of individual preferred exemplary embodiments as well as with reference to the attached drawings, in which.

DESCRIPTION OF THE INVENTION

Figure 1:
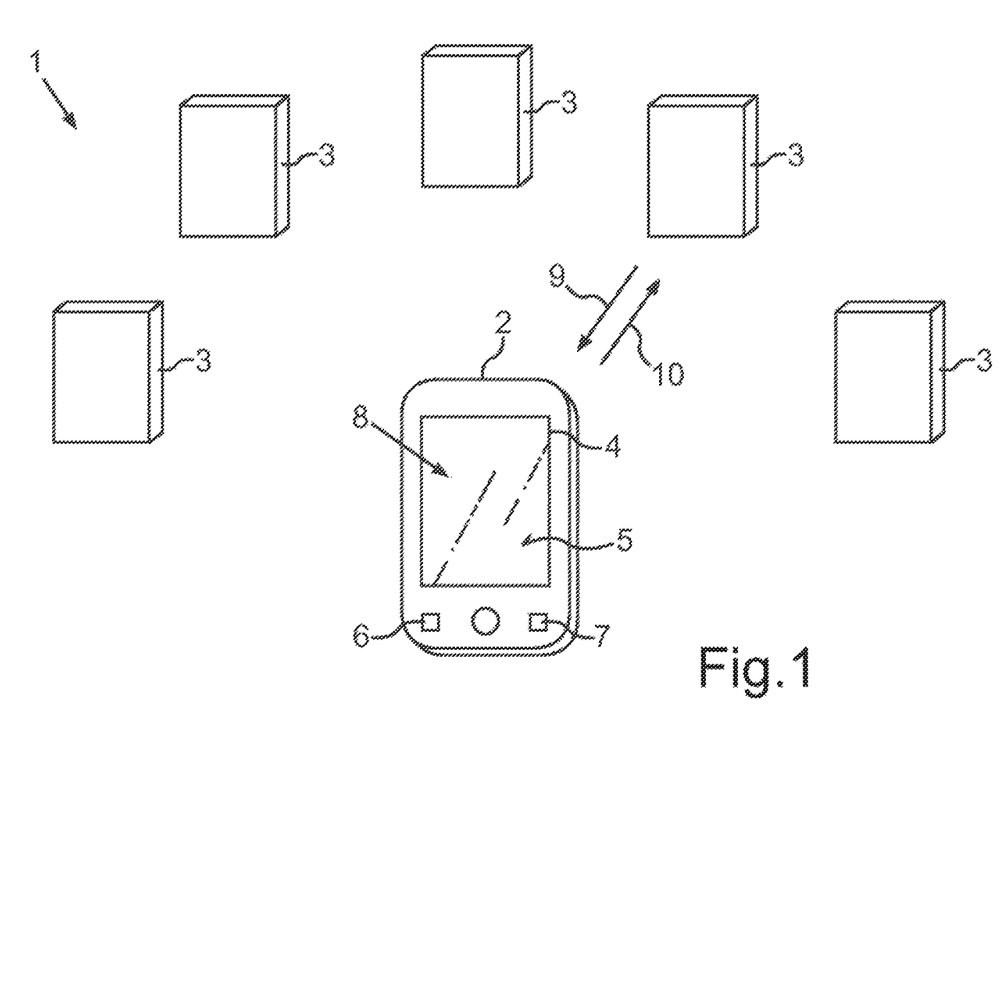
FIG. 1 shows a system comprising household appliances and a portable communication end device according to one embodiment variant of the invention in a schematic view.

A system 1 shown in FIG. 1 comprises a portable communication end device 2 as well as a plurality of household appliances 3 which are installed in a household and can include for example the following household appliances: a washing machine, a tumble dryer, a baking oven, a stove, an extractor hood, a fridge-freezer, a dishwasher and the like. In the exemplary embodiment, the portable communication end device 2 is embodied as a smartphone and has a display apparatus 4 which has a touch-sensitive surface 5 and consequently is embodied overall as a touchscreen. Arranged in the portable communication end device 2 is a control unit 6 which is embodied for actuating the display apparatus 4 and also receives control inputs entered by a user on the touch-sensitive surface 5. In addition, the portable communication end device 2 also comprises a communication apparatus 7 which is embodied for wireless communication with the household appliances 3. This communication can take place for example over a wireless home network, via a WLAN network, for example, or through the medium of an internet server.

An application is installed on the portable communication end device 2 in the form of a computer program. This can be launched by the user at any time by means of corresponding control inputs on the touch-sensitive surface 5. When this application is activated, the control unit 6 generates a graphical user interface 8 on the display apparatus 4, via which user interface 8 the household appliances 3 can be controlled. On the one hand, the respective operating statuses of the household appliances 3 can be output via said graphical user interface 8; on the other hand, the user is able to control the household appliances 3 via the user interface 8 by entering corresponding control inputs.

Overall, therefore, status data 9 containing information about the current operating status can be transmitted from the household appliances 3 to the portable communication end device 2, while control signals 10 can be transmitted to the household appliances 3 by the portable communication end device 2.

The cited graphical user interface 8 can for example have a plurality of separately retrievable pages which are organized in hierarchical order. In this case a separate page can be provided for each household appliance 3, the current operating status of said household appliance 3 being output on the respective page.

Figure 2:
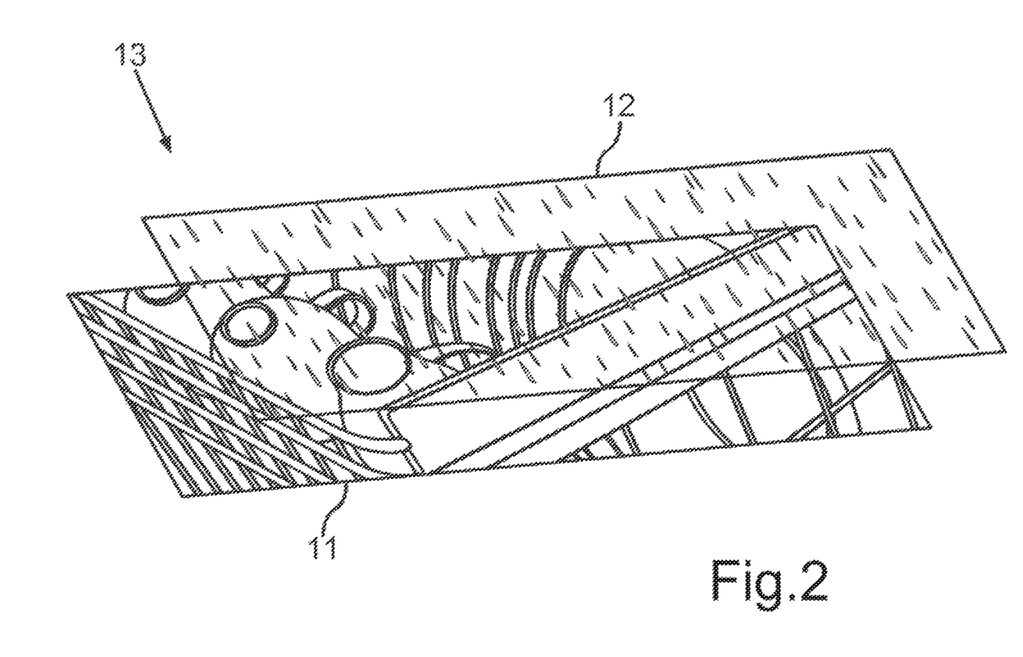
FIG. 2 shows an image depiction comprising a basis image and an overlay image for visualizing a current operating status of a washing machine in a schematic view.

In order to signal the current operating status of the respective household appliance 3 to the user, an image depiction consisting of a basis image and an overlay image superimposed thereon is generated on the respective page. Referring to FIG. 2, in order to visualize the current operating status of a dishwasher, for example, a basis image 11 is provided in which an interior of the dishwasher is illustrated. An overlay image 12 representing a moving animation of water drops is superimposed on said basis image 11. When the dishwasher is activated, this activated operating status can be indicated overall by means of an image depiction 13 which consists of the basis image 11 and the overlay image of moving water drops.

Figure 3A:
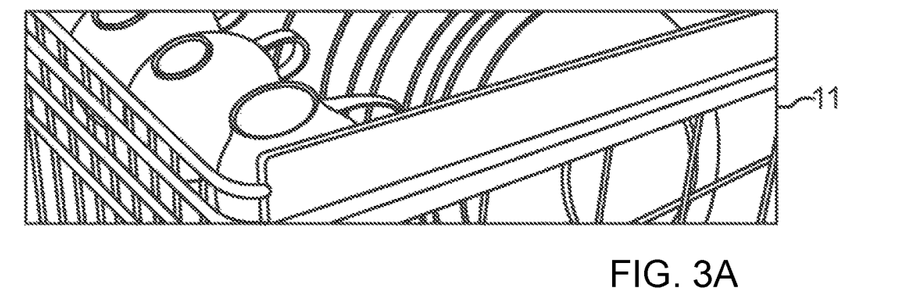
FIGS. 3a to 3c show the basis image, the overlay image and the image depiction generated therefrom in a schematic view.
Figure 3B:
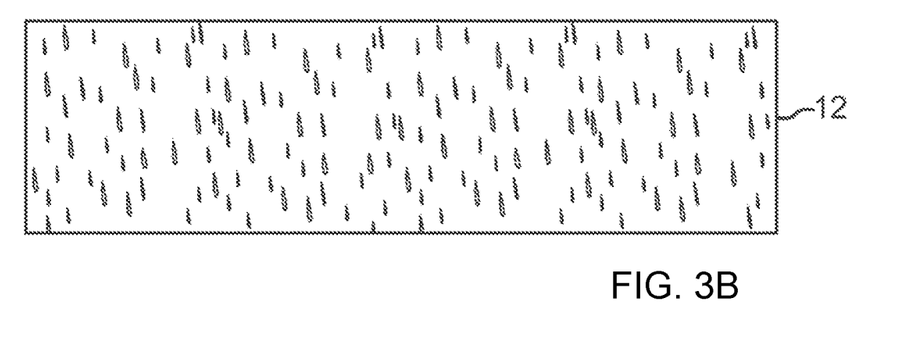
Figure 3C:
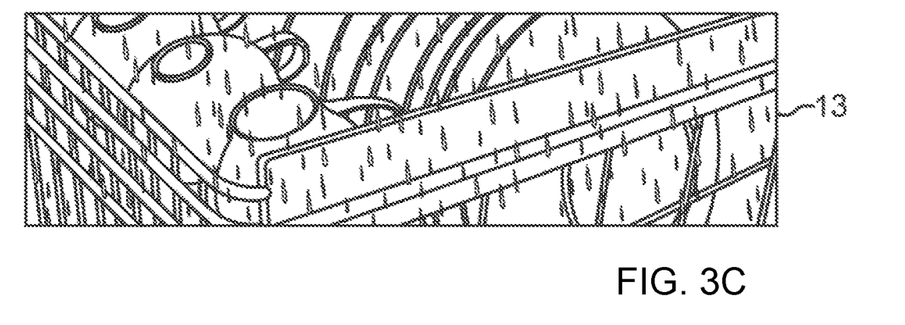

The basis image 11 and the overlay image 12 are also shown in FIGS. 3a and 3b, respectively. FIG. 3c, meanwhile, shows the image depiction 13, as it is presented on the display apparatus 4.

In other words, differential features between the current operating status (in this case the activated operating status) and a reference status (in this case a deactivated status or a standby state) are identified. In the exemplary embodiment, these differential features are represented by the water drops illustrated in the overlay image 12.

All in all, the following image depictions may be provided in order to visualize the current operating status of a dishwasher:

In the off state, in which the household appliance 3 is disconnected from the energy source, a basis image 11 can be displayed in which an empty, unlit interior of the dishwasher is depicted;

in the standby state (appliance is on, but not yet running), a basis image 11 can be displayed in which a lit and colored interior containing variously colored items of dishware in the dry state is depicted; in order to generate said image depiction, the above basis image can be used if necessary and provided with an additional overlay image in which the items of dishware are depicted and/or which represents a color filter; alternatively, however, a different basis image can also be used;

when the dishwasher is activated, the image depiction 13 according to FIG. 3c can be displayed, in which the animated overlay repeatedly shows a jet of water, water spray and drops running down;

during the drying cycle, on the other hand, an overlay image 12 can be chosen in which only individual drops are now shown;

in the finished state, just the interior containing dry items of dishware can be depicted.

The following image depictions may be generated in order to visualize the current operating status of a washing machine:

In the off state, a basis image 11 can be displayed in which an empty washer drum is depicted;

in the standby state, a lit washer drum filled with variously colored, dry items of laundry can be depicted—in this case a different basis image 11 or the same basis image 11 with an overlay image 12 can be displayed;

during the wash cycle, the basis image 11 can be displayed with an overlay image 12 in which wet items of laundry are depicted and which also shows spraying water as well as a washer drum partially filled with water—in addition, an animation depicting moving water sprays and drops running down can also be displayed;

during the spin cycle, a true-to-life "still frame" illustrating the spinning of the variously colored laundry can be displayed together with an overlay image 12 in which spraying water is depicted;

in the finished state, wet items of laundry lying in the washer drum can be displayed.

The following image depictions may be generated in turn in order to visualize the current operating status of a baking oven:

In the off state, a basis image 11 can be displayed in which the interior of the baking oven is depicted in black and white and without foodstuffs;

in the standby state, the interior can be represented in color and possibly filled with foodstuffs;

when the household appliance 3 is activated, an image depiction 13 can be generated in which the colored basis image 11 is overlaid with an overlay image 12 which for example shows an animation depicting heat waves.

The following features are also included in the disclosure:

The invention enables a quick and interesting/novel visualization of appliance statuses (off, on, running, precise status). In the case of a number of appliances it is possible in this regard to obtain a quick overview and all the same to be able to read off precise information concerning the respective operating status of the appliance (e.g. washing, spinning, in the case of the washing machine). However, this is not intended to be realized purely by means of information presented in text form, but is to be creatively supported on a visual level.

The "Living Image" is based on a composition of multiple visual image layers, arranged one on top of the other, which precisely visualize the activity status of the appliance in detail and as a result of their interaction allow a quick overview. In this case photos in the background are combined with (partially) transparent elements such as animations or overlays in the foreground. Many advantages are produced as a result of the combination of still photos and moving animations. Thus, various stimuli are aroused in the user which lead to the information being more noticeable and easier to read. The movement of the animations draws the user's attention and as a result indicates a general activity of the appliance in a quick and eye-catching manner. Color is used as an additional element in order to highlight the activity of the appliance. Thus, in the off state the appliances are shown empty and more in grayscale. In ongoing operation the appliances are filled with variously colored dishes, variously colored items of laundry, etc. and therefore stand out clearly from the depictions without color. At the same time the data transmission and storage overhead can be reduced because the layers are only combined in the terminal device and are therefore "reusable". At the same time discrete elements are easily replaceable or easy to individualize. The choice of animation (e.g. water drops) enables the type of appliance (e.g. water-conducting) to be represented more precisely. The respective status is visualized more precisely through the choice of the background photos.

LIST OF REFERENCE SIGNS

1 System
2 Communication end device
3 Household appliance
4 Display apparatus
5 Surface
6 Control unit
7 Communication apparatus
8 User interface
9 Status data
10 Control signals
11 Basis image
12 Overlay image
13 Image depiction

The invention claimed is:

1. A method for remote monitoring of an operation of a dishwasher, washing machine or washer-dryer by a portable communication end device, which comprises the steps of:

receiving status data of the dishwasher, washing machine or washer-dryer via a communication apparatus of the portable communication end device;

detecting a current operating status of the dishwasher, washing machine or washer-dryer on a basis of received status data by means of a control unit of the portable communication end device; and actuating a display apparatus of the portable communication end device for displaying a graphical user interface for remote monitoring of the operation by means of the control unit, wherein the control unit is configured to identify a current operating status of the dishwasher, washing machine or washer-dryer, to select a basis image representing the dishwasher, washing machine or washer-dryer in a reference status based on the identified current operating status, and to generate and display, via the user interface, an image depiction of the current operating status of the dishwasher, washing machine or washer-dryer, the image depiction of the current operating status including the basis image overlaid by at least one overlay image depicting spraying water and/or individual drops of water, the basis image being stored on said portable communication end device without having been transferred from the dishwasher, washing machine or washer-dryer; and the actuating step including displaying just the basis image in the user interface, without the overlay image, when an off state of the dishwasher, washing machine or washer-dryer is detected by the control unit of the portable communication end device, and displaying the image depiction containing the basis image and the overlay image in the user interface when an activated state of the dishwasher, washing machine or washer-dryer is detected by the control unit of the portable communication end device.

2. The method according to claim 1, which further comprises providing the overlay image in a form of a pictorial animation by means of which the overlay image illustrating the differential features are represented as moving relative to the basis image.

3. The method according to claim 1, which further comprises providing a color filter by means of which a coloring of the basis image is changed and is generated as an overlay image.

4. The method according to claim 1, which further comprises reading out at least one of the basis image or the overlay image from a data memory of the portable communication end device in dependence on the current operating status.

5. A portable communication end device configured for performing a method according to claim 1.

6. A computer program product, comprising:
a non-transitory storage medium storing computer executable instructions for carrying out a method according to claim 1 when executed on a portable communication end device.

7. The method according to claim 1, wherein the overlay image is a pictorial animation.

8. A method for remote monitoring of an operation of a dishwasher, washing machine or washer-dryer by a portable communication end device, which comprises the steps of:
receiving status data of the dishwasher, washing machine or washer-dryer via a communication apparatus of the portable communication end device;
detecting a current operating status of the dishwasher, washing machine or washer-dryer on a basis of received status data by means of a control unit of the portable communication end device; and
actuating a display apparatus of the portable communication end device for displaying a graphical user interface for remote monitoring of the operation by means of the control unit, wherein the control unit is configured to identify a current operating status of the dishwasher, washing machine or washer-dryer, to select a basis image representing the dishwasher, washing machine or washer-dryer in a reference status based on the identified current operating status, and to generate and display, via the user interface, an image depiction of the current operating status of the dishwasher, washing machine or washer-dryer, the image depiction of the current operating status including the basis image overlaid by at least one overlay animation illustrating spraying water and/or individual drops of water as moving relative to the basis image; and
the actuating step including displaying just the basis image in the user interface, without the overlay animation, when an off state of the dishwasher, washing machine or washer-dryer is detected by the control unit of the portable communication end device, and displaying the image depiction containing the basis image and the overlay animation in the user interface when an activated state of the dishwasher, washing machine or washer-dryer is detected by the control unit of the portable communication end device.

\* \* \* \* \*